United States Patent [19]

Blount

[11] 4,304,877

[45] * Dec. 8, 1981

[54] PROCESS FOR THE PRODUCTION OF ALKALI METAL LIGNIN-CELLULOSE SILICATE POLYMER AND REACTION PRODUCTS

[76] Inventor: David H. Blount, 5450 Lea St., San Diego, Calif. 92105

[ * ] Notice: The portion of the term of this patent subsequent to Sep. 2, 1997, has been disclaimed.

[21] Appl. No.: 95,396

[22] Filed: Nov. 19, 1979

Related U.S. Application Data

[63] Continuation-in-part of Ser. No. 6,585, Jan. 26, 1979, Pat. No. 4,211,848, which is a continuation-in-part of Ser. No. 911,829, Jun. 2, 1978, abandoned, which is a continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,629, Sep. 11, 1970, abandoned.

[51] Int. Cl.$^3$ .................................................. C12P 7/30

[52] U.S. Cl. .................................. 521/154; 521/109; 521/110; 521/155; 521/172; 521/175; 521/174; 521/133; 521/131; 521/99; 521/128; 536/56; 536/58; 536/84; 528/75; 528/76; 528/44; 528/80; 528/83; 528/84

[58] Field of Search ............... 536/56, 58, 84; 528/75, 528/76, 44, 80, 83, 84; 521/109, 110, 155, 172, 175, 174, 133, 131, 99, 128, 154

[56] References Cited

U.S. PATENT DOCUMENTS

| | | | |
|---|---|---|---|
| 4,072,637 | 2/1978 | Blount | 260/2.5 |
| 4,097,424 | 6/1978 | Blount | 260/2.5 |
| 4,220,757 | 9/1980 | Blount | 536/84 |
| 4,241,194 | 12/1980 | Blount | 536/84 |
| 4,243,757 | 1/1981 | Blount | 536/84 |

*Primary Examiner*—Melvyn I. Marquis

[57] ABSTRACT

Small particles of lignin-cellulose-containing plants are mixed with an alkali metal silicate, then heated at 80° C. to 120° C. while agitating, thereby producing an alkali metal lignin-cellulose silicate polymer.

28 Claims, No Drawings

PROCESS FOR THE PRODUCTION OF ALKALI METAL LIGNIN-CELLULOSE SILICATE POLYMER AND REACTION PRODUCTS

CROSS-REFERENCE TO RELATED APPLICATIONS

This Application is a continuation-in-part of my co-pending U.S. Patent Application, Ser. No. 066,585, filed Jan. 26, 1979, now U.S. Pat. No. 4,211,848 which is a continuation-in-part of my earlier U.S. Patent Application, Ser. No. 911,829, now abandoned filed June 2, 1978, which is a continuation-in-part of my earlier U.S. Patent Application, Ser. No. 663,924, filed Mar. 4, 1976, now U.S. Pat. No. 4,097,424, which is a continuation-in-part of my earlier U.S. Patent Application, Ser. No. 599,000, filed July 7, 1975, now U.S. Pat. No. 4,072,637, which is a continuation-in-part of my earlier U.S. Patent Application No. 262,485, filed June 14, 1972, now abandoned, which is a continuation-in-part of my earlier U.S. Patent Application, Ser. No. 71,629, filed Sept. 11, 1970, now abandoned.

BACKGROUND OF THE INVENTION

This invention relates to a novel and economical process to react alkali metal silicates with lignin-cellulose-containing plants to produce alkali metal lignin-cellulose silicate polymers, which are highly reactive chemically with various organic and inorganic chemicals, e.g., aldehydes, furan compounds, isocyanates, polyisocyanates, polyurethane prepolymers, polyisocyanate, silicate prepolymers, ketones, vinyl acetate, acrylic acid monomers, allyl halides, polyfunctioning alkylating agents, monofunctional alkylating agents, acrylate compounds, acrylic acid compounds with other vinyl monomers, epihalohydrins with polyamines, polyepoxy compounds with polyamines, sulfur, silicon halides, organic polyhalides, monoepoxy compounds, aldehydes with phenols, aldehydes with amino compounds, vinyl acetate with other vinyl monomers, halohydrins and mixtures thereof.

Plants may be first treated by any of the methods known in the arts, to remove the lignin, and then be reacted with the alkali metal silicate to produce alkali metal silicate polymers which are highly reactive chemically with the various organic and inorganic chemicals listed above.

The alkali metal lignin-cellulose silicate polymer and alkali metal cellulose silicate polymer may be utilized in the production of novel, useful resinous and foam products which may be used as coating agents for wood, metals and plastics, as adhesives, as impregnates, as thermal- and sound-insulating material and as molding powder. The alkali metal lignin-cellulose silicate polymer and alkali metal cellulose silicate polymer may be reacted with a salt-forming compound, e.g., mineral acids and organic acid to produce lignin-cellulose silicate polymer and cellulose silicate polymer which may be used as fillers in paints, varnishes, putties, to, etc.; the lignin-cellulose silicate polymer and cellulose silicate polymer may be chemically reacted with polyisocyanate, polyurethane prepolymers, polyisocyanates, silicate prepolymers, aldehydes, aldehydes with amino compounds, aldehydes with phenol compounds, epoxy compounds, polyepoxy compounds and other organic compounds to produce novel and useful resins to be used as molding powder, coating agents, fillers, etc.

In the process according to the invention, at least two components are used to produce the novel alkali metal lignin-cellulose silicate polymer as follows:
1. Component A: an alkali metal silicate;
2. Component B: a lignin-cellulose-containing plant.

Component A

Any suitable alkali metal silicate may be used in this invention. The commercially available alkali metal silicates have been found to give satisfactory results. It has been found that the sodium silicates are highly satisfactory and are preferred; while the other alkali metal silicates, e.g., potassium and lithium silicates, may be used, they are less preferable on economic grounds. The ratio of $NaO:SiO_2$ may be varied between 1:1 and 1:4. The alkali metal silicate is preferred in a fine, dry granular form. The alkali metal silicate pentahydrate such as sodium metasilicate pentahydrate and potassium metasilicate pentahydrate may also be used. Any suitable mixture of the alkali metal silicates may be used.

Component B

Any suitable lignin-cellulose-containing plant may be used in this invention. Any suitable cellulose may be used in this invention. The plant material is preferred to be in a fine granular form, e.g., sawdust from trees.

Suitable lignin-cellulose-containing plants include trees, shrubs, agricultural plants, grasses, weeds, bamboo, kelp, flowers, algae, etc. Lignin-cellulose plants which have been partially decomposed, such as humus and peat, may be used in this invention. Bark or cork from trees may also be used in this invention.

Cellulose obtained from wood with the lignin removed (wood pulp), cotton, commercial waste products containing cellulose, e.g., paper, cotton cloths, bagasse, may be used in this invention. Coniferous chipper wood dust and coniferous sawmill wood dust are the preferred lignin-cellulose-containing plants.

Any suitable polyisocyanate or liquid isocyanate-terminated polyurethane prepolymer may be reacted with the alkali metal lignin-cellulose silicate polymer or alkali metal cellulose silicate polymer produced in this invention.

Suitable polyisocyanates, isocyanate-terminated polyurethane prepolymers, initiators (catalysts), surfactants, blowing agents and other modifiers are described in detail in Polyurethanes: Chemistry and Technology, Volume XVI, part I and II of The High Polymers series of Saunders and Frisch, Interscience Publishers (1962 and 1964). These books are incorporated herein by reference as they were set forth at length.

Any suitable organic polyisocyanate may be used according to the invention, including aliphatic, cycloaliphatic, araliphatic, aromatic and heterocyclic polyisocyanates. Suitable polyisocyanates which may be employed in the process of the invention are exemplified by the organic diisocyanates which are compounds of the general formula:

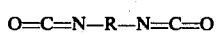

where R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate (sic),
phenylene diisocyanate, m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate,
ethylene diisocyanate.

Other polyisocyanates, polyisothiocyanates and their derivatives may be equally employed. Fatty diisocyanates are also suitable and have the general formula:

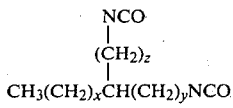

where $x+y$ totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethyleneisocyanates obtained by aniline-formaldehyde condensation followed by phosgenation ("crude MDI"), and modified polyisocyanate-containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides. Phosgenation products of condensates of aniline or anilines alkylsubstituted on the nucleus, with aldehydes or ketones, may be used in this invention. Solutions of distillation residues accumulating during the production of tolylene diisocyanates, diphenyl methane, diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene 1,4-; and methylene-bis-(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also be used in this invention.

Reaction products of from 50 to 99 mols of aromatic diisocyanates with from 1 to 50 mols of conventional organic compounds with a molecular weight of, generally, from about 200 to about 10,000, which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed wth monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylgrycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as $\epsilon$-caprolactone, or hydroxycarboxylic acid such as $\omega$-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or 1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Patent No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 6 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

When an aqueous solution of alkali metal lignin-cellulose silicate polymer is being used to react with, or as a curing agent for, polyisocyanates, and in certain cases where the alkali metal cellulose silicate and alkali metal lignin-cellulose polymer is reacting with polyisocyanates, it is advantageous to use activators (catalysts) such as tertiary amines, e.g., triethylamine, tributylamine, N-methyl morpholine, N-ethyl morpholine, tetramethylenediamine, pentamethyldiethylenetriamine, triethanolamine, triisopropanolamine, organo-metallic compound, e.g., tin acetate, tin oxtoate, tin ethyl hexoate, dibutyl tin diacetate, dibutyl tin dilaurate and mixtures thereof.

Other examples of catalysts which may be used according to the invention and details of their action are described in Kunststoff-Handbuch, Volume VII, published by Vieweg and Hochtlen, Carl-Hanser-Verlag, Munich, 1966, on pages 96 and 102. Silaamines are suitable catalysts, e.g., 2,2,4-trimethyl-2-silamorpholine or 1,3-diethyl aminoethyltetramethyl disiloxane. Suitable catalysts are also tetraalkyl ammonium hydroxides, alkali phenolates, alkali metal hydroxides, alkali alcoholates and hexahydrotriazines.

Suitable flame-resistant compounds may be used in the products of this invention such as those which contain halogen or phosphorus, e.g., tributylphosphate; tris(2,3-dichloropropyl)-phosphate; polyoxypropylenechloromethylphosphonate; cresyldiphenylphosphate; tricresylphosphate; tris(beta-chloroethyl)phosphate; tris(2,3-dichloropropyl)-phosphate; triphenyl-phosphate; ammonium phosphate; perchlorinated diphenyl phosphate; perchlorinated terephenyl phosphate; hexabromocyclodecane; tribromophenol; dibromopropyldiene; hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in "Kunststoff-Handbuch", Volume VII, Munich, 1966, pages 110 and 111, which are incorporated herein by reference. The organic halogen-containing components are, however, preferred in the polyurethane-cellulose-silicate products. Phosphoric acid may be used to react with the alkali metal atoms, thereby producing an alkali metal hydrogen phosphate which may be used as the flame-resistant compound.

The following are examples of curing agents and/or catalysts:

1. Water, when an oxidated silicon compound has been added to other components.

2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of $Ml_2OSiO_2$ (ml=metal) is not critical and may vary within the usual limits, but preferably between 4 to 1 and 0.2 and 1.

3. Water containing 10% to 50% by weight of ammonium silicate.

4. Water containing 5% to 40% by weight of magnesium oxide in the form of a colloidal dispersion.

5. Water containing 10% to 70% by weight of silica sol.

6. Water containing 0.001% to 10% by weight of an activator (catalyst) such as (a) tertiary amines, e.g., triethylamine, tributylamine, N-methyl-morpholine; N-ethyl-morpholine; N-cocomorpholine; N,N,N',N'-tetramethylethylenediamine; 1,4-diazo-biscyclo(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyl-diethanolamine; N-ethyldiethanolamine, and their reactive products with alkylene, e.g., propylene oxide and/or ethylene oxide.

(b) Organo-metallic compounds, preferably organo-tin compounds such as tin salts of carboxylic acid, e.g., tin acetate, tin octoate, tin ethyl hexoate, and tin laurate; and the dialkyl salts of carboxylic acids, e.g., dibutyl tin diacetate, dibutyl tin dilaurate, dibutyl tin maleate or dioctyl tin diacetate.

(c) Silaamines with carbon-silicon bonds as described, e.g., in British Pat. No. 1,090,589, may also be used as activators, e.g., 2,2,4-trimethyl-2-silamorpholine or 1,3-diethylaminomethyl-tetramethyl-di-siloxane.

(d) Other examples of catalysts (activators) which may be used according to the invention and details of their action are described in Kunststoff-Handbuch, Volume VII, published by Vieweg-Hochtlen, Carl-Hanser-Verlag, Munich, 1966, on pages 96 and 102.

7. Water containing 20% to 70% by weight of a water-binding agent being capable of absorbing water to form a solid or a gel, such as hydraulic cement, synthetic anhydrite, e.g., gypsum or burnt lime.

8. Water containing 1% to 10% by weight of bases which contain nitrogen such as tetraalkyl ammonium hydroxides.

9. Any mixture of the above.

The activators may be added separately from the water to promote the reaction of the polyisocyanate with an active hydrogen.

Surface-active additives (emulsifiers and foam stabilizers) may also be used according to the invention. Suitable emulsifiers are, e.g., the sodium salts of ricinoleic sulphonates or of fatty acid diethylamine or stearic acid diethanolamine. Other surface-active additives are alkali metal or ammonium salts of sulphonic acids, e.g., dodecylbenzene sulphonic acid or dinaphthyl methane disulphonic acid, or fatty acids, e.g., ricinoleic acid, or polymeric fatty acids. The commercially available soaps and detergents may be used.

The foam stabilizers used are mainly water-soluble polyester siloxines. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of from 0% to 20%, based on the reaction mixture.

Further examples of surface-active additives, foam stabilizers, cell regulators, negative catalysts, stabilizers, flame-retarding substances, plasticizers, dyes, fillers and fungicidal and bacteriocidal substances, and details about methods of using these additives and their actions, may be found in Kunststoff-Handbuch, Volume VI; published by Vieweg and Hochtlen, Carl-Hanser-Verlag, Munich, 1966, e.g., on pages 103 to 113. The halogenated paraffins and inorganic sales of phosphoric acid are the preferred fire-retardant agents.

The surfactants may be used in this invention such as sodium dioctyl sulfosuccinate, potassium dioctyl sulfosuccinate and dioctyl calcium sulfosuccinate.

DETAILED DESCRIPTION OF THE INVENTION

The preferred process to produce alkali metal lignin-cellulose silicate polymer is to mix about 1 to 3 parts by weight of a fine granular lignin-cellulose-containing plant with about 2 parts by weight of an alkali metal silicate, then heat to 80° C. to 120° C. for 10 to 60 minutes while agitating at ambient pressure, thereby producing granules of alkali metal lignin-cellulose silicate polymer. The color of the polymer remains about the same as that of the original plant particles.

The alkali metal lignin-cellulose silicate may be further heated at a temperature of 120° C. to 150° C. while agitating for 10 to 30 minutes to produce a dark-brown, broken-down alkali metal lignin-cellulose silicate polymer which is water-soluble.

A further step may be taken wherein the alkali metal lignin-cellulose silicate polymer is mixed with a mineral acid, organic acid, hydrogen-containing salt or mixtures thereof until the pH is 6 to 8, thereby producing a lignin-cellulose silicate compound and salt. The salt is removed by washing and filtering. Any suitable inorganic acid may be used, e.g., sulfuric acid, hydrochloric acid and phosphoric acid. Any suitable organic acid may be used in this invention such as monocarboxylic acids and polycarboxylic acids. Any suitable hydrogen-containing salts may be used, e.g., sodium hydrogen sulfide, potassium hydrogen chloride and sodium dihydrogen phosphate.

In an alternate process, the lignin may be removed from the lignin-cellulose-containing plant by any of the methods commonly known in the arts, e.g., alkali process (Krafts), to produce cellulose particles. Then about 1 to 3 parts by weight of the dry cellulose particles are mixed with about 2 parts by weight of dry granular alkali metal silicate pentahydrate, then heated to 80° C. to 120° C. while agitating for 10 to 60 minutes, thereby producing a granular alkali metal cellulose silicate polymer.

A further step may be taken wherein 1 to 5 parts by weight of a polyisocyanate are mixed with 2 parts by weight of the alkali metal lignin-cellulose silicate polymer produced in this invention, then agitated at 20° C. to 40° C. for 10 to 30 minutes, thereby producing a polyisocyanate alkali metal lignin-cellulose silicate prepolymer.

The polyisocyanate alkali metal lignin-cellulose silicate prepolymer may be cured by heating to 60° C. to 100° C. while agitating until the prepolymer begins to expand, thereby producing a rigid polyurethane silicate foam. The polyisocyanate alkali metal lignin-cellulose silicate prepolymer may also be cured by the addition of a curing agent and/or activator (catalyst). The polyisocyanate alkali metal lignin-cellulose silicate prepolymer may also be cured by the addition of an acid, e.g., acetic acid, until the pH is from 6 to 8.

The curing agent may be added to the polyurethane silicate prepolymer in the amount of 0% to 100%, based on the weight of the prepolymer. The activator may be added in the amount of 0.01% to 10% by weight, based on the weight of the prepolymer.

A further step may be taken wherein a polyol (organic polyhydroxyl compound) in the amount of 1 to 5 parts by weight, a polyisocyanate in the amount of 1 to 5 parts by weight and 2 parts by weight of the alkali metal lignin-cellulose polymer produced in this invention are mixed thoroughly and in a few seconds to several minutes, the mixture begins to expand to produce a polyurethane silicate foam. The type of foam may vary from a flexible, to semi-flexible, to a rigid, product depending on the type and amount of polyol used.

The preferred method of reacting the alkali metal lignin-cellulose polymer polyisocyanate and polyol is first to produce the polyisocyanate alkali metal lignin-cellulose prepolymer by reacting the mixture of 2 parts by weight of the alkali metal lignin-cellulose silicate polymer with 1 to 5 parts by weight of a polyisocyanate at 20° C. to 40° C. for 10 to 30 minutes, thereby producing a polyisocyanate alkali metal lignin-cellulose prepolymer, then mixing with 1 to 5 parts by weight of a polyol. The mixture begins to expand in a few seconds to 5 minutes to produce a polyurethane silicate foam.

The type of foam may vary from flexible to semiflexible to a rigid product, depending on the type and amount of polyol used.

A polyurethane silicate foam may be produced by simultaneously mixing lignin-cellulose-containing plant particles, an alkali metal silicate and a polyisocyanate, then heating the mixture between 20° C. to 120° C. for 10 to 60 minutes, thereby producing a polyurethane silicate reaction product.

Readily volatile blowing agents, e.g., dichlorodifluoromethane, trichlorofluoromethane, butane, isobutylene, vinyl chloride, etc., may be used to produce cellular solid products in this invention. The blowing agent is a chemical inert compound which boils within a range of from −25° C. to 80° C. and is added in an amount up to 50% by weight, based on the reaction mixture. In addition, the liquid reaction mixtures can be expanded into a foam by the introduction of gases, optionally under pressure, such as air, $CF_4$, noble gases and $H_2O_2$, the resulting foam being introduced into the required mold and hardened therein. The resultant foam may, optionally, contain foam stabilizers such as surfactants, foam formers, emulsifiers and, if desired, organic or inorganic fillers or diluents may initially be converted by blowing gas into a foam, and the resulting foam may subsequently be mixed in a mixer with the other components, the resulting mixture being allowed to harden. Instead of blowing agents, it is also possible to use inorganic or organic, finely-divided hollow bodies such as expanded hollow beads of glass, plastic, straw, expanded clay, and the like, for producing foams.

The foams obtainable in this way can be used in either their dry or their moist form, if desired, after a compacting or tempering process, optionally carried out under pressure, as insulating materials, cavity fillings, packaging materials, building materials, etc. They can also be used in the form of sandwich elements, for example, with metal-covering layers in house, vehicle and aircraft construction.

It is also possible to introduce into the foaming reaction mixtures, providing they are still free-flowing, organic and/or inorganic foamable or already foamed particles such as, for example, expanded clay, expanded glass, wood, popcorn, cork, hollow beads of plastics such as vinyl chloride polymers, polyethylene, styrene polymers or foam particles thereof or even, for example, polysulphone, polyepoxide, polyurethane, phenoplasts, aminoplasts, polyimide polymers, phenoplast silicates, aminoplast silicates, epoxy silicate polymers, polyisocyanate polymers, polyurethane silicate polymers or their reaction mixtures; the foaming mixture may be allowed to foam through interstitial spaced particles in packed volumes of these particles and, in this way, insulating materials can be produced. Combinations of expanded clay, glass or slate are especially preferred with the reaction mixture, according to the invention.

It is also possible to introduce into the foaming reaction mixtures, providing they are still free-flowing at a predetermined temperature, a blowing agent which is capable of evaporating or of gas formation at this temperature, such as, for example, a halogenated hydrocarbon. The initial liquid mixture formed can be used not only for producing uniform foams or non-uniform foams containing foamed or unfoamed fillers, but it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture, vehicle and aircraft industries.

The cellular solid products (foams) according to the invention can be added to soil in the form of crumbs, optionally in admixtures with fertilizers and plant-protection agents, in order to improve its agrarian consistency.

Since the hardened foams obtained by the process according to the invention can show considerable porosity after drying, they are suitable for use as drying agents because they can absorb water; however, they can also be charged with active substances or used as catalyst supports or as filters and absorbents.

On the other hand, the foams can be subsequently lacquered, metallized, coated, laminated, galvanized, subjected to vapor deposition, bonded or flocked in either their moist or their dry form or in impregnated form. The moldings can be further processed in their moist or their dried form, for example, by sawing, milling, drilling, planing, polishing and other machining techniques. The optionally filled moldings can be further modified in their properties by thermal after-treatment, oxidation processes, hot-pressing, sintering processes or surface melting or other consolidation processes. Suitable mold materials include inorganic and/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonate, etc.

Fillers in the form of particulate or powdered materials can be additionally incorporated into the liquid mixtures of the foamable reactants for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film, etc.; pieces of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black; Al-, Fe-, Cu-, Ag-powder; molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched, organic polymers including plastics and rubber waste. Of the number of suitable organic polymers, the following, which can be present, for example, in the form of powders, granulate, foam particles, beads, hollow beads, foamable or unfoamed particles, fibers, ribbons, woven fabrics, webs, etc., are mentioned purely by way of examples: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyurea, polyethers, polyurethanes, polyimides, polyamides, polysulphones, polycarbonates and, of course, any copolymers as well. Inorganic fillers are preferred.

Generally, the composite materials according to the invention can be filled with considerable quantities of fillers without losing their valuable property spectrum. The amount of fillers can exceed the amount of the reactants. In special cases, the foamed products of the present invention act as a binder for such fillers.

Basically, the production of the cellular solid products according to the invention is carried out by mixing the reactants in one or more stages in a continuously- or intermittently-operating mixing apparatus and by then allowing the resulting mixture to foam and solidify, usually outside the mixing apparatus in molds or on suitable materials. The reaction temperatures required for this, which may be from 0° C. to 200° C., and preferably from 20° C. to 160° C., may be achieved either by heating one or more of the reactants before the mixing process or by heating the mixing apparatus itself, or, alternatively, by heating the reaction mixture after the components have been mixedd. Combinations of these or other methods of adjusting the reaction temperature may, of course, also be employed. In most cases, sufficient heat is evolved during the reaction to enable the reaction temperature to rise to values above 50° C. after the reaction or foaming has begun.

In particular, however, the process according to the invention is suitable for in situ foaming on the building site. Any hollow forms obtained by means of shuttering in the conventional way may be filled up and used for foaming in this way.

The cellular solid product may be sawed into slabs which then are used for insulation in houses, boats, vehicles, airplanes, etc. The cellular product may also be chopped by a suitable machine into particles and poured or blown into places such as ceilings, walls, etc., and be used for thermal and sound insulation. The cellular product may also be used as a molding powder and be molded into useful products by heat and pressure in a mold.

The process according to the invention to produce the polyisocyanate-cellulose-silicate foam, polyurethane-lignin-cellulose-silicate foam, polyurethane-cellulose-silicate foam and polyisocyanate-lignin-cellulose-silicate foam are particularly suitable, however, for in situ foaming on the building site. Any hollow molds normally produced by shuttering in forms can be used for casting and foaming. The reaction mixture, optionally containing a blowing agent, emulsifier, foam stabilizer, filler, flame-retardant agent, diluents, dodorants, coloring agents and other agents, produced by adding the components simultaneously to a mixing apparatus, is immediately pumped or sprayed by compressed air into a mold, e.g., walls, ceilings, cold or heated relief molds, solid molds, hollow molds, etc., where it may be left to harden. The foaming reaction mixture may also be forced, cast or injection-molded into cold or heated molds, then hardened, optionally under pressure and at room temperature or at temperatures up to 200° C., optionally using a centrifugal casting process. At this stage, reinforcing elements in the form of inorganic and/or organic or metal wires, fibers, non-woven webs, foams, fabrics, supporting structures, etc., may be incorporated in the foaming mixtures. This may be achieved, for example, by the fibrous-web-impregnation process or by processes in which the reaction mixtures and reinforcing fibers are applied together to the mold, for example, by means of a spray apparatus. The molded products obtained in this way may be used as building elements, e.g., in the form of optionally foamed sandwich elements which may be subsequently laminated with metal, glass, plastics, etc. The fire characteristics of the material are good, but are improved by the addition of flame-retardant agents. On the other hand, the products may be used as hollow bodies, e.g., as containers for goods which are required to be kept moist or cool, or the hollow bodies may be used as filter materials or exchanges, as catalyst carriers or as carriers of other active substances, as decoration elements, shock-resistant packaging, furniture components and cavity fillings. They may also be used in the production of molds for metal casting and in model building. The cellular products may also be produced by pouring the components into a mold, then mixing well, after which the mixture expands, then hardens in the mold. The mold may be in the form of a large slab so that it can be cut into various sizes, shapes and thicknesses as desired. The reaction mixtures may also be foamed up and hardened while in the form of droplets or may be dispersed, e.g., in petroleum hydrocarbons or while they are under condition of free fall. The foamed products produced by these methods may also be added in a crumbly form to soil, optionally with the addition of fertilizers and plant-protective agents so as to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time, and will be protected against erosion. The foaming mixtures may also be used underground in caves, mines, tunnels, etc., by spraying the foaming mixture onto wire mesh, fiberglass cloth, woven fabrics or directly on the walls, to produce protective layers to prevent cave-ins.

It is also possible to introduce into the foaming reaction mixtures, providing they are still free-flowing, inorganic and/or organic foamable or already foamed particles such as expanded clay, expanded glass, wood, popcorn, cork, hollow beads of plastics, for example, vinyl chloride polymers, polyethylene, styrene polymers or foam particles thereof or even, for example, polysulphone, polyepoxides, polyurethane, ureaformaldehyde, phenol formaldehyde, polyimide polymers, or the reaction mixtures may be allowed to foam through interstitial space in packed volumes of these particles, and in this way to produce insulating materials which are distinguished by excellent flame behavior. Combinations of expanded clay, glass or slate with the reaction mixtures, according to the invention, are especially preferred.

Most of these polyisocyanate-lignin-cellulose silicate and polyurethane-cellulose-silicate cellular solid products are soluble in certain organic solvents and may be utilized in paints, varnishes, adhesives, fillers, caulking materials, etc.

The object of the present invention is to provide a novel process to produce alkali metal-lignin-cellulose silicate polymers from lignin-cellulose-containing plants and alkali metal silicates. Another object is to produce novel alkali metal-lignin-cellulose-silicate condensation products which are highly reactive. Still another object is to produce novel alkali metal-cellulose-silicate polymers. Another object is to produce novel solid lignin-cellulose-silicate condensation products. Still another object is to produce alkali metal-cellulose-silicate condensation products which will react chemically with polyisocyanates to produce novel polyisocyanates-lignin-cellulose-silicate solid or cellular solid products.

Another object is to produce novel alkali metal-cellulose-silicate condensation product that will react with polyisocyanates to produce novel polyisocyanate-cellulose-silicate resins and foams. Another object is to produce alkali metal-cellulose-silicate condensation products that will react with an acid compound to produce novel lignin-cellulose-silicate polymers. Another object is to produce alkali metal-lignin-cellulose-silicate condensation products what will react with polyisocyanate compounds and polyurethane prepolymers to produce novel resins and cellular products.

DESCRIPTION OF PREFERRED EMBODIMENTS

My invention will be illustrated in greater detail by the specific examples which follow, it being understood that these preferred embodiments are illustrative of, but are not limited to, procedures which may be used in the production of alkali metal-lignin-cellulose-silicate condensation products. Parts and percentages are by weight unless otherwise indicated.

EXAMPLE 1

About 1 part by weight of dry sawdust from fir wood and about 1 part by weight of sodium metasilicate pentahydrate are mixed, then heated to above the melting temperature of sodium metasilicate pentahydrate (80° C. to 120° C.) for 10 to 60 minutes, depending on the volume, while agitating, thereby producing tan-colored granules of sodium lignin-cellulose polymer.

EXAMPLE 2

About 2 parts by weight of wood flour from a southern pine tree and about 3 parts by weight of fine granular commercial sodium silicate containing about 5 mols of water per each mol of sodium silicate are mixed, then heated to 80° C. to 120° C. while agitating for 10 to 60 minutes, thereby producing tan-colored granules of sodium lignin-cellulose silicate polymer.

EXAMPLE 3

About 3 parts by weight of fine, dry sawdust from live oak wood and 2 parts by weight of potassium metasilicate pentahydrate are mixed, then heated to 80° C. to 120° C. while agitating for 10 to 60 minutes, thereby producing brown granules of potassium lignin-cellulose silicate polymer.

EXAMPLE 4

About 50 grams of short cotton fibers and about 50 grams of sodium metasilicate pentahydrate are mixed, then heated to about 100° C. while agitating for about 15 minutes, thereby producing white granules of sodium cellulose silicate polymer.

EXAMPLE 5

About 100 grams of dry fir wood pulp produced by removing the lignin by the alkaline (Kraft) process and 100 grams of commercial sodium silicate granules containing about 5 to 8 mols of water per mol of sodium silicate are mixed, then heated to 80° C. to 120° C. for about 20 minutes while agitating, thereby producing cream-colored granules of sodium cellulose silicate polymer.

Wood pulp produced from other trees such as pine, redwood, cedar, oak, spruce, gum, hemlock, walnut, hickory, eucalyptus, birch, poplar, beech, maple, mahogany, aspen, ash, cypress, elm, cherry, sycamore and mixtures thereof may be used in place of the fir pulp. The wood pulp may be produced by any of the well known processes, e.g., Kraft, soda process, acid sulfite process, etc.

EXAMPLE 6

About equal parts by weight of sodium metasilicate pentahydrate and small dried seaweed (kelp) particles are mixed, then heated to 80° C. to 120° C. while agitating for 10 to 60 minutes, thereby producing sodium alginate-cellulose silicate polymer.

The alginic acid may be first extracted from the kelp, then only the cellulose portion of the plant used to produce sodium cellulose silicate polymer.

EXAMPLE 7

About equal parts by weight of fine granular commercial sodium silicate and finely ground dry corn cobs (sawdust-size particles) are mixed, then heated while agitating for 10 to 60 minutes, thereby producing sodium lignin-cellulose silicate polymer.

Other agricultural waste products may be used in place of corn cobs such as corn stalks, soybean stalks, cane sugar stalks (bagasse), pea vines and stalks, cotton stalks, rice straw, wheat straw, oat straw, barley straw, sugar beat waste, sorghum stalks, maize stalks, tobacco stalks, buckwheat stalks, etc., and mixtures thereof.

EXAMPLE 8

About equal parts by weight of washed, shredded and dried waste paper and sodium metasilicate pentahydrate granules are mixed, then heated to 80° C. to 120° C. while agitating for 10 to 60 minutes, thereby producing sodium cellulose silicate polymer.

EXAMPLE 9

6 normal sulfuric acid is added to 1 part by weight of the sodium lignin-cellulose silicate polymer produced in Example 1 while agitating until the pH is about 7, thereby producing lignin-cellulose polymer and sodium sulfate. The sodium is filtered off, thereby producing lignin-cellulose silicate.

EXAMPLE 10

Dilute hydrochloric acid is added to 1 part by weight of sodium cellulose silicate as produced in Example 5 until the pH is about 7, white agitating, thereby producing cellulose silicate and sodium chloride. The water and sodium chloride are filtered off, thereby recovering cellulose silicate.

EXAMPLE 11

1 part by weight of toluene diisocyanate (TDI), 1 part by weight of sodium metasilicate pentahydrate and 1 part by weight of fir wood sawdust are mixed, then heated to 30° C. to 40° C. while agitating for 10 to 20 minutes, thereby producing a polyisocyanate alkali metal lignin-cellulose silicate prepolymer. The prepolymer is then heated to 80° C. to 120° C. while agitating until the prepolymer begins to expand, thereby producing a rigid polyurethane silicate foam which has expanded about 3 times its original volume.

EXAMPLE 12

About 2 parts by weight of crude MDI (phosgenation product of aniline-formaldehyde condensation), 2 parts by weight of fine, dry sodium silicate and 1 part by weight of spruce wood powder are mixed, then heated to 30° C. to 40° C. while agitating for 10 to 20 minutes, thereby producing a polyisocyanate sodium lignin-cellulose silicate prepolymer. Then 0.5 part by weight of acetic acid is rapidly and thoroughly mixed and the mixture expands 4 to 5 times its original volume to produce a tan-colored, rigid polyurethane silicate foam.

EXAMPLE 13

About 2 parts by weight of the sodium lignin-cellulose silicate polymer produced in Example 2 and 3 parts by weight of TDI (toluene diisocyanate) are mixed, then heated to 30° C. to 40° C. while agitating for about 10 to 20 minutes, thereby producing a polyisocyanate sodium lignin-silicate prepolymer.

EXAMPLE 14

2 parts by weight of the polyisocyanate sodium lignin-silicate prepolymer as produced in Example 13 are mixed with 1 part by weight of polyethylene glycol (molecular weight 600) and in 15 to 120 seconds, the mixture begins to expand. It expands 5 to 10 times its original volume to produce a cream-colored flexible polyurethane silicate foam.

EXAMPLE 15

100 grams of the polyisocyanate sodium lignin-cellulose silicate prepolymer as produced in Example 13 are heated to 60° C. to 100° C. while agitating for about 15 to 30 seconds until the mixture begins to expand. It expands 3 to 5 times its original volume to produce a rigid, cream-colored polyurethane foam.

EXAMPLE 16

About 100 parts by weight of the polyisocyanate sodium lignin-cellulose silicate prepolymer as produced in Example 13 are mixed thoroughly with 10 parts by weight of water containing 3% sodium dioctyl sulfosuccinate and the mixture forms a solid polyurethane silicate reaction product in 1 to 2 minutes.

EXAMPLE 17

About 100 parts by weight of the polyisocyanate sodium lignin-cellulose silicate prepolymer as produced in Example 13 and 10 parts by weight of water containing 20% sodium silicate and 10% trimethylamine are mixed rapidly for 15 seconds and the mixture expands 3 to 5 times its original volume, thereby producing a rigid, cream-colored polyurethane silicate foam.

EXAMPLE 18

About 100 parts by weight of the polyisocyanate alkali lignin-cellulose silicate prepolymer produced in Example 13 and 100 parts by weight of water containing 30% sodium silicate, 5% triethylamine and 3% sodium dioctyl sulfosuccinate are rapidly and thoroughly mixed. The mixture forms a soft, cream-colored putty which slowly hardens over 6 to 10 hours to produce a solid reaction product and may be used as a cavity filler.

EXAMPLE 19

About 100 parts by weight of the polyisocyanate sodium lignin-cellulose silicate prepolymer produced in Example 13, about 50 parts by weight of NIAX polyol LHT 240 produced by Union Carbide and 20 parts by weight of acetic acid are vigorously mixed for 15 seconds and the mixture expands 10 to 15 times its original volume to produce a semi-rigid, tan-colored polyurethane silicate foam.

The foam is tough, flame-resistant and may be used for thermal insulation, sound insulation, cavity filling, etc.

EXAMPLE 20

About 100 parts by weight of the polyisocyanate sodium lignin-cellulose prepolymer produced in Example 13 are mixed with 0.02 part by weight of stannous octoate, 10 parts by weight of trichlorofluoromethane and then vigorously mixed for 15 seconds with 20 parts by weight of water containing 30% sodium silicate, 3% DABCO 33LV produce by Air Products and 0.5 part by weight of Surfactant L-5420 produced by Union Carbide. The mixture expands 6 to 12 times its original volume to produce a rigid, tough, cream-colored polyurethane silicate foam.

EXAMPLE 21

The alkali metal lignin-cellulose silicate polymer produced in Example 1 is further heated at 120° C. to 150° C. while agitating for 10 to 30 minutes, thereby producing dark-brown granules of water-soluble, broken-down alkali metal lignin-cellulose silicate polymer which may be used to react with other organic compounds such as polyurethane to produce foams which may be used for thermal and sound insulation.

EXAMPLE 22

About 2 parts by weight of the alkali metal lignin-cellulose silicate polymer as produced in the Examples listed below, 2 parts by weight of a polyol, listed below, and 2 parts by weight of tolylene diisocyanate (80% of 2,4-isomer and 20% of 2,6-isomer) are added simultaneously at ambient temperature and pressure, then rapidly and vigorously mixed. In a few seconds to 10 minutes, the mixture expands about 8 to 12 times its original volume to produce tough, cream-to-brown-colored, cellular solid polyurethane silicate foam.

| Example | Alkali metal lignin-cellulose silicate | Polyol |
|---------|----------------------------------------|--------|
| a | As produced in Example 1 | Triethylene glycol |
| b | As produced in Example 2 | Propylene glycol |
| c | As produced in Example 3 | Glycerol |
| d | As produced in Example 4 | Butylene glycol |
| e | As produced in Example 5 | Polyethylene glycol (mol. wt. 480) |
| f | As produced in Example 6 | Glycerol |
| g | As produced in Example 7 | Polypropylene glycol (mol. wt. 600) |
| h | As produced in Example 8 | Polyethylene glycol (mol. wt. 1000) |
| i | As produced in Example 1 | Polypropylene glycol (mol. wt. 1200) |
| j | As produced in Example 2 | Polyester (3.8 mols glycerol, 0.5 mol phthalic anhydride and 2.5 mols adipic acid) |
| k | As produced in Example 1 | Castor oil |
| l | As produced in Example 3 | Poly B-D R45M (a liquid hydroxyl-terminated |

| Example | Alkali metal lignin-cellulose silicate | Polyol |
| --- | --- | --- |
| | | polybutadiene) produced by Arco Chemical Co. |
| m | As produced in Example 1 | POLY G 30-56 produced by Olin Chemical |

EXAMPLE 23

About 2 parts by weight of the alkali metal lignin-cellulose silicate polymer as produced in the Example 1, 3 parts by weight of an isocyanate-terminated polyurethane prepolymer, listed below, and 0.1 part by weight of DABCO 33LV produced by Air Products are added simultaneously at ambient temperature and pressure, then rapidly and vigorously mixed. In a few seconds to 5 minutes, the mixture expands about 8 to 12 times its original volume to produce a polyurethane silicate foam.

| Example | Isocyanate-terminated polyurethane prepolymer |
| --- | --- |
| a | ISONATE 181 produced by Upjohn Co.; |
| b | ISONATE 143L produced by Upjohn Co.; |
| c | Toluene diisocyanate with polypropylene glycol (mol. wt. 500) in an NCO/OH ratio of 25:1; |
| d | 20% solution of a distillation residue of the distillation of commercial tolylene diisocyanate in a crude phosgenation product of an aniline-formaldehyde condensation with an NCO content of about 30%, with polyethylene glycol (mol. wt. 1000) to produce an isocyanate-terminated prepolymer with an NCO content of about 17%; |
| e | Toluene diisocyanate with castor oil to produce a prepolymer with an NCO content of about 15%; |
| f | Diisocyanateodiphenylmethane with a tetrafunctional polypropylene glycol (mol. wt. 500) to produce a prepolymer having about 20% NCO groups; |
| g | Toluene diisocyanate with a liquid hydroxyl-terminated polybutadiene (mol. wt. about 1000) available from Arco Chemical Co. under the trade designation of "POLY B-D R45M" to produce a prepolymer with an NCO content of about 7%; |
| h | Toluene diisocyanate with a hydroxyl-group-containing polysulfide polymer to produce a prepolymer with an NCO content of about 12%; |
| i | Methylene bis-phenyl diisocyanate with a liquid polyepichlorohydrin to produce a prepolymer of about 21%; |
| j | Tolylene diisocyanate with a polyester (4 mols of glycerol, 2.5 mols of adipic acid and 0.5 mol phthalic anhydride) to produce a prepolymer with an NCO content of about 23%; |
| k | MDI with polyethylene (mol. wt. 2000) to produce a prepolymer with an NCO content of about 28%. |

EXAMPLE 24

10 parts by weight of the alkali metal lignin-cellulose silicate polymer are further heated to 120° C. to 150° C. while agitating for 10 to 30 minutes, thereby producing a water-soluble broken-down alkali metal lignin-cellulose silicate polymer.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for the production of alkali metal lignin-cellulose silicate polymer by mixing and reacting the following:
   (A) 2 parts by weight of alkali metal silicate;
   (B) 1 to 3 parts by weight of lignin-cellulose containing plant;
   the reaction is carried out by heating the mixture at 80° C. to 120° C. while agitating at ambient pressure for 10 to 60 minutes.

2. The process of claim 1 wherein the alkali metal silicate is selected from the group consisting of sodium silicate, potassium silicate, and mixtures thereof.

3. The process of claim 1 wherein an additional step is taken wherein an acid compound selected from the group consisting of inorganic acids, organic acids and hydrogen-containing salts is added to the alkali metal lignin-cellulose silicate polymer until the pH is 6 to 8, thereby producing a lignin-cellulose silicate polymer.

4. The product produced by the process of claim 1.

5. The product produced by the process of claim 3.

6. The process of claim 1 wherein an additional step is taken wherein a polyisocyanate alkali metal lignin-cellulose silicate prepolymer is produced by mixing and reacting 2 parts by weight the alkali metal lignin-cellulose silicate polymer of claim 1 and 1 to 5 parts by weight of a polyisocyanate at 20° to 40° C.

7. The product polyisocyanate alkali metal lignin-cellulose silicate prepolymer, produced by the process of claim 6.

8. The process of claim 6 wherein the polyisocyanate is selected from the group consisting of arylene polyisocyanates, alkylene polyisocyanates and mixtures thereof.

9. The process of claim 6 wherein the polyisocyanate is selected from the group consisting of toluene diisocyanate, p,p'-diphenylmethane diisocyanate, the phosgenation product of aniline-formaldehyde condensation and mixtures thereof.

10. The process of claim 1 wherein an additional step is taken wherein about 2 parts by weight of the alkali metal lignin-cellulose silicate polymer are mixed and reacted with 1 to 5 parts by weight of a polyisocyanate at 20° to 40° C., then cured by heating to 60° C. to 100° C., thereby producing a polyurethane silicate reaction product.

11. The product, polyurethane silicate reaction product, produced by the process of claim 10.

12. The process of claim 1 wherein an additional step is taken wherein about 2 parts by weight of the alkali metal lignin-cellulose silicate polymer, 1 to 5 parts by weight of a polyisocyanate and 1 to 5 parts by weight of a polyol are mixed and reacted at 20° to 160° C. to produce a polyurethane silicate foam.

13. The product produced by the process of claim 12.

14. The process of claim 1 wherein an additional step is taken wherein two parts by weight of the alkali metal lignin-cellulose silicate polymer of claim 1 are mixed and reacted with a polyisocyanate at 20° C. to 40° C. to produce a polyisocyanate alkali metal lignin-cellulose silicate prepolymer which is then mixed with a blowing agent consisting of a chemical inert compound which boils within a range of from −25° to 80° C., up to 20% by weight of foam stabilizer consisting of water-soluble polyester siloxines, percentage based on the reaction mixture, a and a curing agent selected from the group consisting of water, water containing 20% to 40% sodium silicate, water containing 20% to 40% silica sol, and mixtures thereof in an amount up to 100% by weight and an activator is selected from the group consisting of a tertiary amine, organic tin compounds, and mixtures thereof in the amount of 0.01% to 10%, based on the weight of the polyisocyanate alkali metal lignin-cellulose silicate prepolymer, and reacted at 20° to 160° C. to produce a polyurethane silicate foam having a density of between 1 to 40 pounds per cubic foot.

15. The product polyurethane silicate foam, produced by the process of claim 14.

16. The process of claim 1 wherein an additional step is taken wherein about 2 parts by weight of an alkali metal lignin-cellulose polymer are mixed and reacted with 1 to 5 parts by weight of a liquid isocyanate-terminated polyurethane prepolymer at 20° to 40° C. to produce a polyurethane silicate reaction product.

17. The product polyurethane silicate reaction product, produced by the process of claim 16.

18. The process of claim 16 wherein the liquid isocyanate-terminated polyurethane prepolymer is selected from the group consisting of isocyanate-terminated polyester, isocyanate-terminated polyether, isocyanate-terminated polybutadiene, isocyanate-terminated polysulfide, isocyanate-terminated polyols, isocyanate-terminated polyol silicates, isocyanate-terminated organic polyester silicates and mixtures thereof.

19. The process of claim 1 wherein an additional step is taken wherein about 2 parts by weight of the alkali metal lignin-cellulose polymer, 1 to 5 parts by weight of a liquid isocyanate-terminated polyurethane prepolymer, up to 50% by weight, percentage based on the reaction mixture, of a a blowing agent consisting of a chemical inert compound which boils within the range of from −25° C. to 80° C., up to 20% by weight of a foam stabilizer consisting of water-soluble polyester siloxines, percentage based on the reaction mixture, and a curing agent selected from the group consisting of water, water containing 20% to 40% by weight of sodium silicate, water containing 20% to 40% by weight of silica sol, and mixtures thereof in an amount up to 100% by weight, percentage based on the isocyanate-terminated polyurethane prepolymer and an activator selected from the group consisting of tertiary amine, organic tin compounds, and mixtures thereof in an amount of 1.01% to 10%, based on the weight of the isocyanate-terminated polyurethane prepolymer, are mixed and reacted at 20° to 160° C. thereby producing a polyurethane silicate foam.

20. The process of claim 1 wherein an additional step is taken wherein 2 parts by weight of the alkali metal lignin-cellulose silicate polymer are reacted with 1 to 5 parts by weight of a polyisocyanate to produce a polyisocyanate at 20° to 40° C. to produce a polyisocyanate alkali metal lignin-cellulose prepolymer, then is mixed thoroughly with 1 to 5 parts by weight of a polyol at and reacted, thereby producing a polyurethane silicate reaction product.

21. The product, polyurethane silicate reaction product, produced by the process of claim 20.

22. The process of claim 1 wherein an additional step is taken wherein 2 parts by weight of the alkali metal lignin-cellulose silicate polymer are mixed and reacted with 1 to 5 parts by weight of a polyisocyanate at 20° to 40° C. to produce a polyisocyanate alkali metal lignin-cellulose polymer, then mixed thoroughly with 1 to 5 parts by weight of a polyol, up to 50% by weight, percentage based on the reaction mixture, of a blowing agent consisting of a chemical inert compound which boils within the range of from −25° C. to 80° C., up to 20% by weight of a foam stabilizer consisting of water-soluble polyester siloxines, percentage based on the reaction mixture, a curing agent selected from the group consisting of water, water containing 20% to 40% by weight of sodium silicate, water containing 20% to 40% by weight of silica sol and mixtures thereof in an amount up to 100% by weight based on the weight of the polyisocyanate alkali metal lignin-cellulose prepolymer and an activator selected from the group consisting of tertiary amine, organic tin compounds, and mixtures thereof, in an amount of 0.01% to 10% by weight, percentage based on the weight of the polyisocyanate alkali metal lignin-cellulose prepolymer are mixed and reacted thereby producing a polyurethane silicate foam.

23. The process of claim 1 wherein the alkali metal lignin-cellulose polymer is further heated at 120° C. to 150° C. for 10 to 30 minutes while agitating, thereby producing a water-soluble, alkali metal lignin-cellulose silicate polymer.

24. The process of claim 1 wherein an additional step is taken wherein 1 to 5 parts by weight of a polyisocyanate, are mixed with the alkali metal silicate and lignin-cellulose containing plant particles of claim 1, thereby producing a polyurethane silicate reaction product.

25. The product produced by the process of claim 23.

26. The product produce by the process of claim 24.

27. The product, polyurethane silicate foam, as produced by the process of claim 19.

28. The product, polyurethane silicate foam, as produced by the process of claim 22.

* * * * *